(12) United States Patent
Cleveland

(10) Patent No.: US 7,023,900 B2
(45) Date of Patent: Apr. 4, 2006

(54) SYSTEM AND METHOD FOR MODIFYING PEAK-TO-AVERAGE POWER RATIO IN CDMA TRANSMITTERS

(75) Inventor: Joseph Robert Cleveland, Richardson, TX (US)

(73) Assignee: Samsung Electronics Co., Ltd., Suwon-City (KR)

( * ) Notice: Subject to any disclaimer, the term of this patent is extended or adjusted under 35 U.S.C. 154(b) by 844 days.

(21) Appl. No.: 10/022,767

(22) Filed: Dec. 14, 2001

(65) Prior Publication Data
US 2002/0159427 A1    Oct. 31, 2002

Related U.S. Application Data

(60) Provisional application No. 60/273,272, filed on Mar. 2, 2001.

(51) Int. Cl.
H04B 1/69 (2006.01)

(52) U.S. Cl. .................................................. 375/146

(58) Field of Classification Search ................ 375/130, 375/135, 146; 370/320, 335, 342, 441
See application file for complete search history.

(56) References Cited

U.S. PATENT DOCUMENTS

| | | | | |
|---|---|---|---|---|
| 5,396,515 A | * | 3/1995 | Dixon et al. | 375/150 |
| 5,631,929 A | * | 5/1997 | Jones et al. | 375/295 |
| 5,745,480 A | * | 4/1998 | Behtash et al. | 370/252 |
| 5,793,797 A | * | 8/1998 | Giallorenzi et al. | 375/141 |
| 6,009,090 A | * | 12/1999 | Oishi et al. | 370/342 |
| 6,148,022 A | * | 11/2000 | Raghavan et al. | 375/146 |
| 6,236,864 B1 | * | 5/2001 | McGowan et al. | 455/522 |
| 6,266,320 B1 | * | 7/2001 | Hedberg et al. | 370/206 |
| 6,393,047 B1 | * | 5/2002 | Popovic' | 375/140 |
| 6,430,213 B1 | * | 8/2002 | Dafesh | 375/146 |
| 6,434,135 B1 | * | 8/2002 | Ozluturk et al. | 370/342 |
| 6,504,862 B1 | * | 1/2003 | Yang | 375/146 |
| 6,587,452 B1 | * | 7/2003 | Davidovici et al. | 370/342 |
| 6,628,929 B1 | * | 9/2003 | Nomura | 455/126 |
| 6,920,127 B1 | * | 7/2005 | Ozluturk et al. | 370/342 |
| 2004/0110525 A1 | * | 6/2004 | Black et al. | 455/522 |

* cited by examiner

*Primary Examiner*—Emmanuel Bayard

(57) ABSTRACT

A CDMA transmitter that limits the peak-to-average ratio to a selected maximum level. The CDMA transmitter comprises: 1) a first baseband combiner for receiving N baseband chip streams, each of the N baseband chip streams comprising a sequence of chips, each chip having one of a positive amplitude value and a negative amplitude value, wherein the first baseband combiner combines chips from corresponding time slots in each of the N baseband chip streams to thereby generate a first composite baseband chip sequence; 2) a data processor for detecting a first peak amplitude in the first composite baseband chip sequence that exceeds a pre-determined maximum threshold and determining an amplitude and a polarity of a first compensation pulse associated with the first peak amplitude; and 3) a pulse generator for generating the first compensation pulse having the amplitude and the polarity determined by the data processor. The first baseband combiner then combines the first compensation pulse with the first composite baseband chip sequence during a chip time slot corresponding to the first peak amplitude.

22 Claims, 6 Drawing Sheets

SYSTEM AND METHOD FOR MODIFYING PEAK-TO-AVERAGE POWER RATIO IN CDMA TRANSMITTERS

The present invention claims priority to U.S. Provisional Application Ser. No. 60/273,272 filed Mar. 2, 2001.

TECHNICAL FIELD OF THE INVENTION

The present invention is directed, in general, to code division multiple access (CDMA) wireless communication devices and, more specifically, to an apparatus for controlling the peak-to-average power ratio of the input signal of a CDMA transmitter.

BACKGROUND OF THE INVENTION

Wireless communication systems, including cellular phones, paging devices, personal communication services (PCS) systems, and wireless data networks, have become ubiquitous in society. Wireless service providers continually try to create new markets for wireless devices and to expand existing markets by making wireless devices and services cheaper and more reliable. The price of end-user wireless devices, such as cell phones, pagers, PCS systems, and wireless modems, has been driven down to the point where these devices are affordable to nearly everyone and the price of a wireless device is only a small part of the end-user's total cost. To continue to attract new customers, wireless service providers concentrate on reducing infrastructure costs and operating costs, and on increasing handset battery lifetime, while improving quality of service in order to make wireless services cheaper and better.

To maximize usage of the available bandwidth, a number of multiple access technologies have been implemented to allow more than one subscriber to communicate simultaneously with each base station (BS) in a wireless system. These multiple access technologies include time division multiple access (TDMA), frequency division multiple access (FDMA), and code division multiple access (CDMA) These technologies assign each system subscriber to a specific traffic channel that transmits and receives subscriber voice/data signals via a selected time slot, a selected frequency, a selected unique code, or a combination of these factors.

CDMA technology is used in wireless computer networks, paging (or wireless messaging) systems, and cellular telephony. In a CDMA system, mobile stations and other access terminals (e.g., pagers, cell phones, laptop PCs with wireless modems) and base stations transmit and receive data on the same frequency in assigned channels that correspond to specific unique orthogonal codes. For example, a mobile station may receive multiple forward channel data signals from a base station. Each forward channel signal transmitted by the base station is formatted, repeated, encoded, formatted, interleaved, spread with a Walsh code assigned to that channel, and separated into an in-phase (I) digital stream and a quadrature (Q) digital stream. The I-digital stream is further spread by an in-phase pseudo-noise (PN) code. The Q-digital stream is spread by a quadrature pseudo-noise code. The PN-modulated I-digital stream and the PN modulated Q-digital stream are filtered by a finite impulse response (FIR) filter and then used for subsequent quadrature phase-shift keying (QPSK) modulation of a radio frequency (RF) carrier signal.

In another embodiment, a base station may receive reverse channel data signals from mobile stations that are formatted, repeated, encoded, block-interleaved, and spread prior to transmission by the mobile station with a pseudo-noise code based on the mobile station identification number. In another embidiment, the data signals may be encoded with 64-ary or M-ary modulation prior to block interleaving. Those skilled in the art will recognize that a mobile station may employ quadrature phase shift keying (QPSK) modulation, binary phase shift keying (BPSK) modulation, quadrature amplitude modulation (QAM) or other digital modulation format for modulation of a radio frequency (RF) carrier for transmission of the data signals. One such implementation, is found in the TIA/EIA-95 CDMA standard (also known as IS-95). Another implementation is the TIA/EIA-2000 standard (also known as IS-2000).

Power amplifiers for amplification of CDMA signals have traditionally been some of the most expensive components of a wireless communication system and have often resisted attempts aimed at lowering their cost. A key design specification for power amplifiers used for amplification of CDMA signals used in cellular radio systems is limitation on adjacent channel power (ACP). ACP is a result of signal distortion caused by the non-linearity of the devices used in power amplifiers that produces undesired spectral components in adjacent transmission channels. Usually, devices are more linear with lower input signal levels. That is, for a given device, signals with less strength experience less distortion and, thus, have lower ACP. A transmitter (or power amplifier) may need to operate in back-off mode (reduced input signal level) to reduce signal distortion in order to meet the ACP requirements. However, the required amplifier back-off to accommodate large peak power signals leads to higher cost, inefficient operation and excessive heat dissipation—all of which combine to raise system cost significantly. It has therefore been the goal of designers to reduce peak-to-average power ratios as much as possible without degrading other performance parameters.

For example, U.S. Pat. No. 5,930,299 discloses a digital modulator with compensation that reduces the peak-to-average power ratio of a modulated signal to allow an increase in power amplifier efficiency. In the digital modulator with compensation, a digital bit stream is sent to an encoder which translates bit sequences into I and Q digital pulses. These target symbol sequences have been predetermined to cause excessive amplitude peaking in the modulated signal. If a target symbol sequence is encountered, it is adjusted using amplitude or filter compensation. The compensation is implemented by adjusting the coefficients of I and Q finite impulse response (FIR) pulse-shaping filters for one or more symbols in each target symbol sequence. Non-target symbol sequences in the digital bit stream are largely unaffected. The I and Q FIR pulse-shaping filters are followed by I and Q digital-to-analog converter (DAC) and reconstruction filters. Together, the filters shape the I and Q pulses according to communication system specifications. The filtered I and Q signals are then sent to a quadrature modulator for RF modulation, amplified, and transmitted over a communication channel. Howver, the device disclosed in U.S. Pat. No. 5,930,299 requires repeated adjustment of the I and Q FIR pulse-shaping filter coefficients, which is processor intensive and which may not yield adequate filtering of ACP for all combinations of Walsh or spreading codes.

U.S. Pat. No. 5,838,732 discloses a wideband digital combiner that generates a composite signal as a frequency multiplexed combination of many narrowband modulated digital carrier signals. The technique used by the digital combiner involves introducing predetermined phase shifts into each of the digital channel signals after a baseband modulation step. The wideband composite signal thus exhibits a reduced peak-to-average signal power, despite the fact that the phases of the digital carrier signals cannot be directly controlled. This permits the use of a power amplifier, which may have a much smaller peak-to-average rating. However, those skilled in the art will recognize that the phase shifting of the digital channel signals degrades the detection and demodulation of the QPSK signals at the receiver by introducing phase jitter or zero-crossing jitter. Furthermore, it decreases the auto-correlation magnitude of desired signals and increasing the cross-correlation magnitude of undesired signals thereby increasing the level of interference.

U.S. Pat. No. 5,606,578 discloses a communication device in which a digital processor responds to an information generator by alternately mapping the digital information onto a first or a second constellation diagram to produce data symbols. The processor processes the data symbols alternately from the first and second constellation diagrams in order to minimize the peak-to-average power ratio at the amplifier. This alternating scheme allows the power amplifier to operate more efficiently. However, this mapping to different constellations to produce data symbols changes the Walsh modulation sequence at the receiving station and thereby removes the unique identification for the traffic channel.

Therefore, there is a need in the art for improved CDMA-based wireless devices that minimize peak-to-average power ratio without suffering the other performance degradations associated with the prior art systems.

SUMMARY OF THE INVENTION

The present invention provides an apparatus and method for reducing the peak-to-average ratio, or crest factor, of the transmitted waveform for direct sequence spread spectrum (DSSS) code division multiple access (CDMA) signals. Reduction of the peak-to-average ratio (i.e., crest factor) allows improved power amplifier efficiency, reduced heat dissipation requirements, smaller heat sinks, lower system size and weight, reduced power supply load, and lower cost for CDMA cellular base stations.

To address the above-discussed deficiencies of the prior art, it is a primary object of the present invention to provide a CDMA transmitter that limits the peak-to-average ratio to a selected maximum level. According to an advantageous embodiment of the present invention, the CDMA transmitter comprises: 1) a first baseband combiner capable of receiving N baseband chip streams, each of the N baseband chip streams comprising a sequence of chips, each chip having one of a positive amplitude value and a negative amplitude value, wherein the first baseband combiner combines chips from corresponding time slots in each of the N baseband chip streams to thereby generate a first composite baseband chip sequence; 2) a data processor coupled to the first baseband combiner capable of detecting a first peak amplitude in the first composite baseband chip sequence that exceeds a pre-determined maximum threshold and determining an amplitude and a polarity of a first compensation pulse associated with the first peak amplitude; and 3) a pulse generator coupled to the data processor capable of generating the first compensation pulse having the amplitude and the polarity determined by the data processor, wherein the first baseband combiner receives the first compensation pulse and combines the first compensation pulse with the first composite baseband chip sequence during a chip time slot corresponding to the first peak amplitude.

According to one embodiment of the present invention, the data processor determines the amplitude and the polarity of the first compensation pulse as a function of a maximum peak-to-average power ratio associated with the first composite baseband chip sequence.

According to another embodiment of the present invention, each chip in each of the N baseband chip streams has one of a +1 relative amplitude value and −1 relative amplitude value.

According to still another embodiment of the present invention, the CDMA transmitter further comprises: 4) a second baseband combiner capable of receiving M baseband chip streams, each of the M baseband chip streams comprising a sequence of chips, each chip having one of a positive amplitude value and a negative amplitude value, wherein the second baseband combiner combines chips from corresponding time slots in each of the M baseband chip streams to thereby generate a second composite baseband chip sequence, wherein the data processor coupled to the second baseband combiner and is further capable of detecting a second peak amplitude in the composite baseband chip sequence that exceeds a pre-determined maximum threshold and determining an amplitude and a polarity of a second compensation pulse associated with the second peak amplitude; and 5) a second pulse generator coupled to the data processor capable of generating the second compensation pulse having the amplitude and the polarity determined by the data processor, wherein the second baseband combiner receives the second compensation pulse and combines the second compensation pulse with the second composite baseband chip sequence during a chip time slot corresponding to the second peak amplitude.

According to yet another embodiment of the present invention, the data processor determines the amplitude and the polarity of the second compensation pulse as a function of a maximum peak-to-average power ratio associated with the second composite baseband chip sequence.

According to a further embodiment of the present invention, the chip in each of the M baseband chip streams has one of a +1 relative amplitude value and −1 relative amplitude value.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged code division multiple access (CDMA) transmitter.

Figure 1:
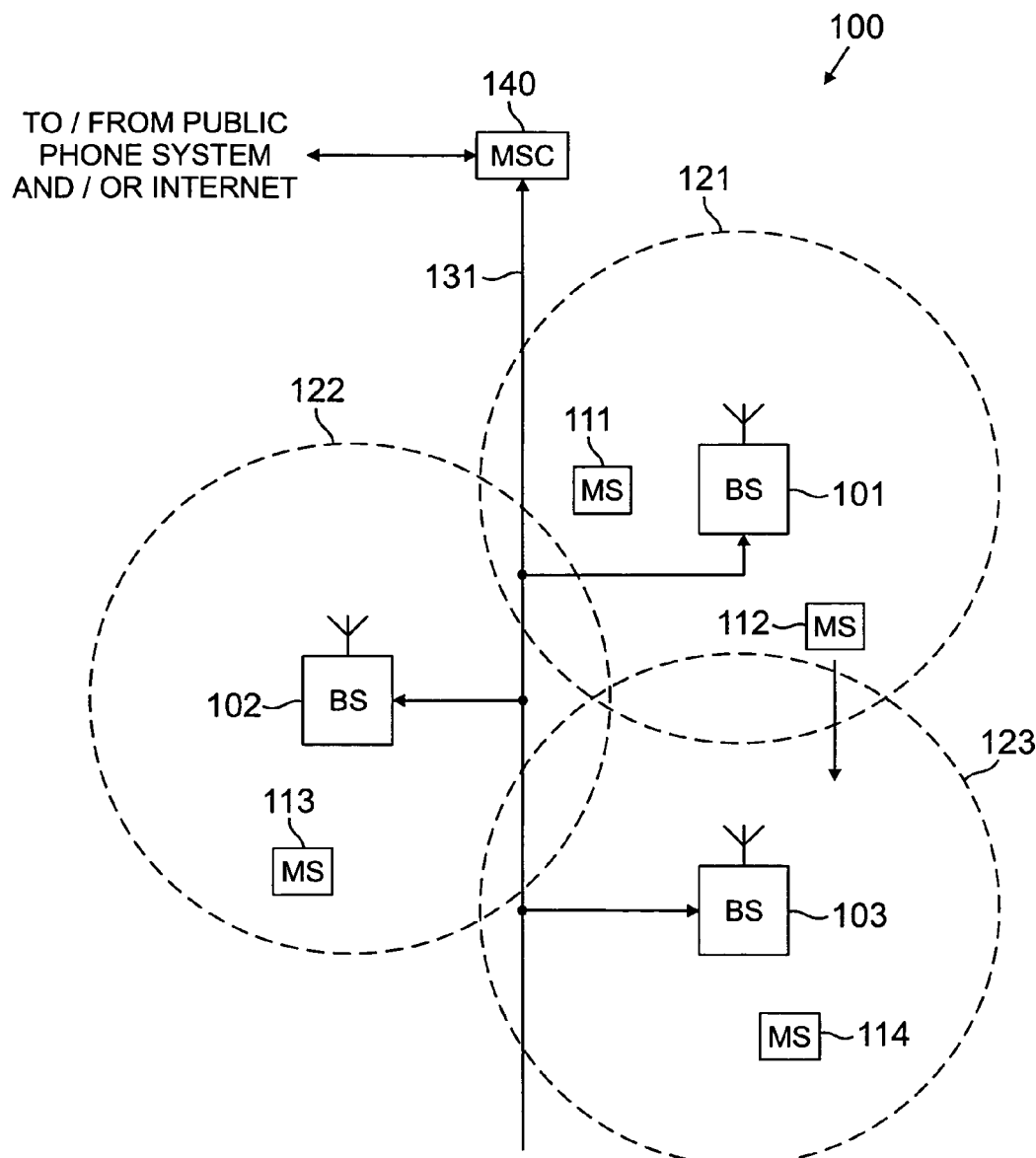
FIG. 1 illustrates an exemplary wireless network, in which base stations implement power amplifiers according to the principles of the present invention.

FIG. 1 illustrates exemplary wireless network 100, in which base stations implement power amplifiers according to the principles of the present invention. Wireless network 100 comprises a plurality of cell sites 121–123, each containing one of the base stations, BS 101, BS 102, or BS 103. Base stations 101–103 are operable to communicate with a plurality of mobile stations (MS) 111–114 over CDMA channels. Mobile stations 111–114 may be any suitable cellular devices, including conventional cellular telephones, PCS handset devices, portable computers, metering devices, and the like. Other types of access terminals, including fixed access terminals, also may be present in wireless network 100. However, for the sake of simplicity, only mobile stations are shown.

Dotted lines show the approximate boundaries of the cell sites 121–123 in which base stations 101–103 are located. The cell sites are shown approximately circular for the purposes of illustration and explanation only. It should be clearly understood that the cell sites may have other irregular shapes, depending on the cell configuration selected and natural and man-made obstructions.

In one embodiment of the present invention, BS 101, BS 102, and BS 103 may comprise a base station controller (BSC) and a base transceiver station (BTS). Base station controllers and base transceiver stations are well known to those skilled in the art. A base station controller is a device that manages wireless communications resources, including the base transceiver station, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers. For the purpose of simplicity and clarity in explaining the operation of the present invention, the base transceiver station in each of cells 121, 122, and 123 and the base station controller associated with each base transceiver station are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Communications line 131 may be any suitable connection means, including a T1 line, a T3 line, a fiber optic link, a network backbone connection, and the like. Mobile switching center 140 is well known to those skilled in the art. Mobile switching center 140 is a switching device that provides services and coordination between the subscribers in a wireless network and external networks, such as the public telephone system. In some embodiments of the present invention, communications line 131 may be several different data links, where each data link couples one of BS 101, BS 102, or BS 103 to MSC 140.

In one advantageous embodiment, BS 101, BS 102 and BS 103 transfer data signals between each other and the Internet or other packet data network (not shown) via communications line 145 and data core network (DCN) server 150. Data core network (DCN) server 150 is well known to those skilled in the art. Data core network (DCN) server 150 is a packet data switching or routing device that provides services and coordination between the subscribers in a wireless network and external packet data networks, such as a corporate Ethernet system and/or the Internet. Communications line 145 may be any suitable connection line, including an Ethernet link, a T1 connection, a T3 line, a fiber optic link, a network backbone connection, and the like. In some embodiments, communications line 145 may comprise several different data links, where each data link couples one of BS 101, BS 102, or BS 103 to data core network (DCN) 150.

In the exemplary wireless network 100, MS 111 is located in cell site 121 and is in communication with BS 101, MS 113 is located in cell site 122 and is in communication with BS 102, and MS 114 is located in cell site 123 and is in communication with BS 103. The MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a handoff will occur.

As is well known, the handoff procedure transfers control of a call from a first cell to a second cell. As MS 112 moves from cell 121 to cell 123, MS 112 detects the pilot signal from BS 103 and sends a Pilot Strength Measurement Message to BS 101. When the strength of the pilot transmitted by BS 103 and received and reported by MS 112 exceeds a threshold, BS 101 initiates a soft handoff process by signaling the target BS 103 that a handoff is required as described in TIA/EIA-95 or TIA/EIA-2000. BS 103 and MS 112 proceed to negotiate establishment of a communications link in the CDMA channel as described in TIA/EIA-95 or TIA/EIA-2000. Following establishment of the communications link between BS 103 and MS 112, MS 112 communicates with both BS 101 and BS 103 in a soft handoff mode. Those acquainted with the art will recognize that soft handoff improves the performance on both forward and reverse links. When the signal from BS 101 falls below a threshold, MS 112 may then drop the link with BS 101 and only receive signals from BS 103. MS 112 then transfers on-going voice, data, or control signals through BS 103. The call is thereby seamlessly transferred from BS 101 to BS 103. An idle handoff is a handoff between cells of a mobile device that is communicating in the control or paging channel, rather than transmitting voice and/or data signals in the regular traffic channels.

Figure 2A:
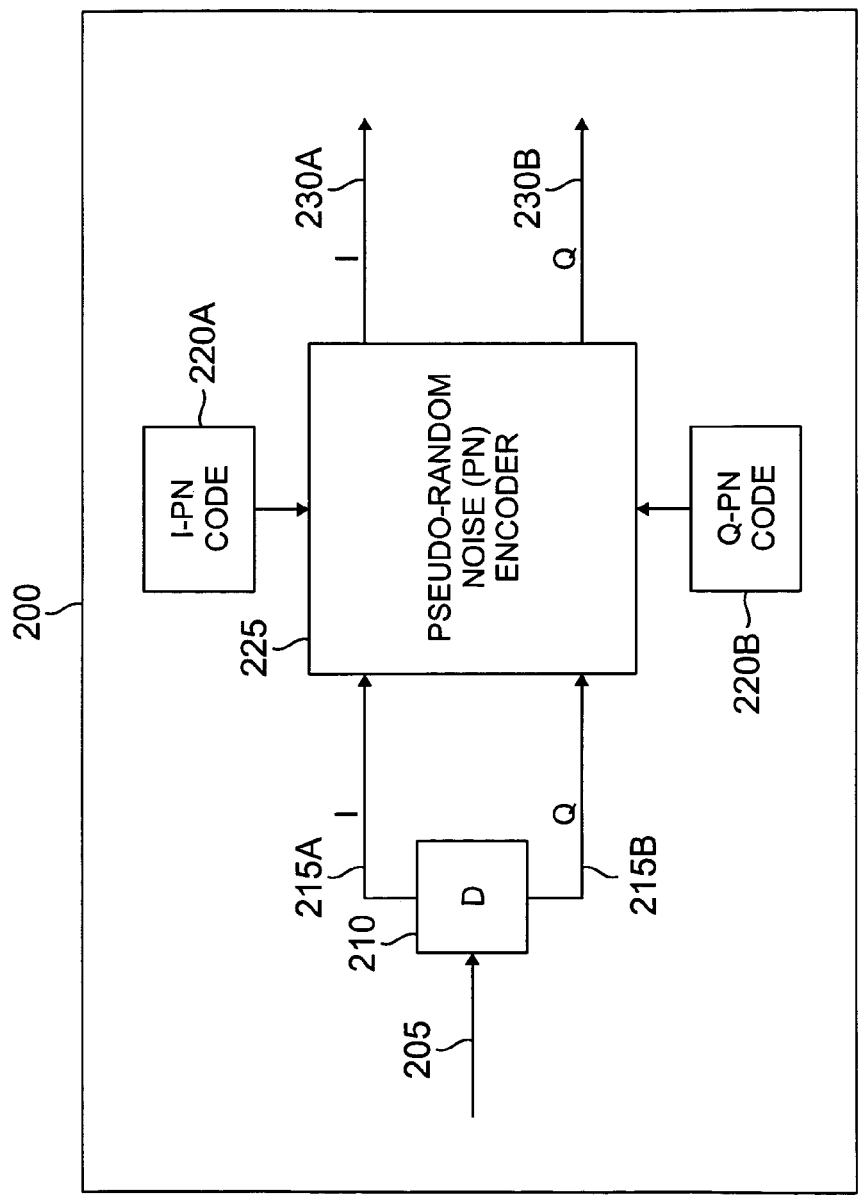
FIG. 2A illustrates selected portions of the transmitter circuitry that generate in-phase digital streams and quadrature digital streams according to one embodiment of the present invention.

FIG. 2A illustrates selected portions of the transmitter circuitry for CDMA quadrature generator 200 of each CDMA channel used for quadrature phase shift keying (QPSK) modulation in base station 101 according to one embodiment of the present invention. Each input forward channel signal 205 to quadrature generator 200 and transmitted by the base station is convolutionally encoded, formatted, interleaved and spread with a Walsh code assigned to that channel according to one embodiment as described by TIA/EIA-95 or TIA/EIA-2000. Those skilled in the art will recognize that the forward traffic channel is comprised of the pilot channel, the synchronization channel, one or more paging channels, and one or more traffic channels. Demultiplexer 210 separates the digital components of each input forward channel signal 205 into an in-phase I-Branch component 215A and a quadrature-phase Q-Branch component 215B. Those skilled in the art will recognize that the mapping of the input digital signal into quadrature components may occur by duplicating each digital bit on I and Q branches 215A and 215B, respectively, or by alternating each digital bit on the I-Branch 215A and the Q-Branch 215B, respectively. Pseudo-noise encoder 225 spreads the I-Branch digital stream with pilot in-phase pseudo-noise code (I-PN) according to TIA/EIA-95 or TIA/EIA-2000 in one embodiment of the invention to produce a PN-coded, in-phase component 230A. Pseudo-noise encoder 225 spreads the Q-Branch digital stream with pilot quadrature-phase pseudo-noise code (Q-PN) according to TIA/EIA-95 or TIA/EIA-2000 in one embodiment of the invention to produce a PN-coded, quadrature-phase component 230B.

Those skilled in the art will also recognize that the signal amplitude for each signal channel in the forward traffic channel may have a different amplitude.

Figure 2B:
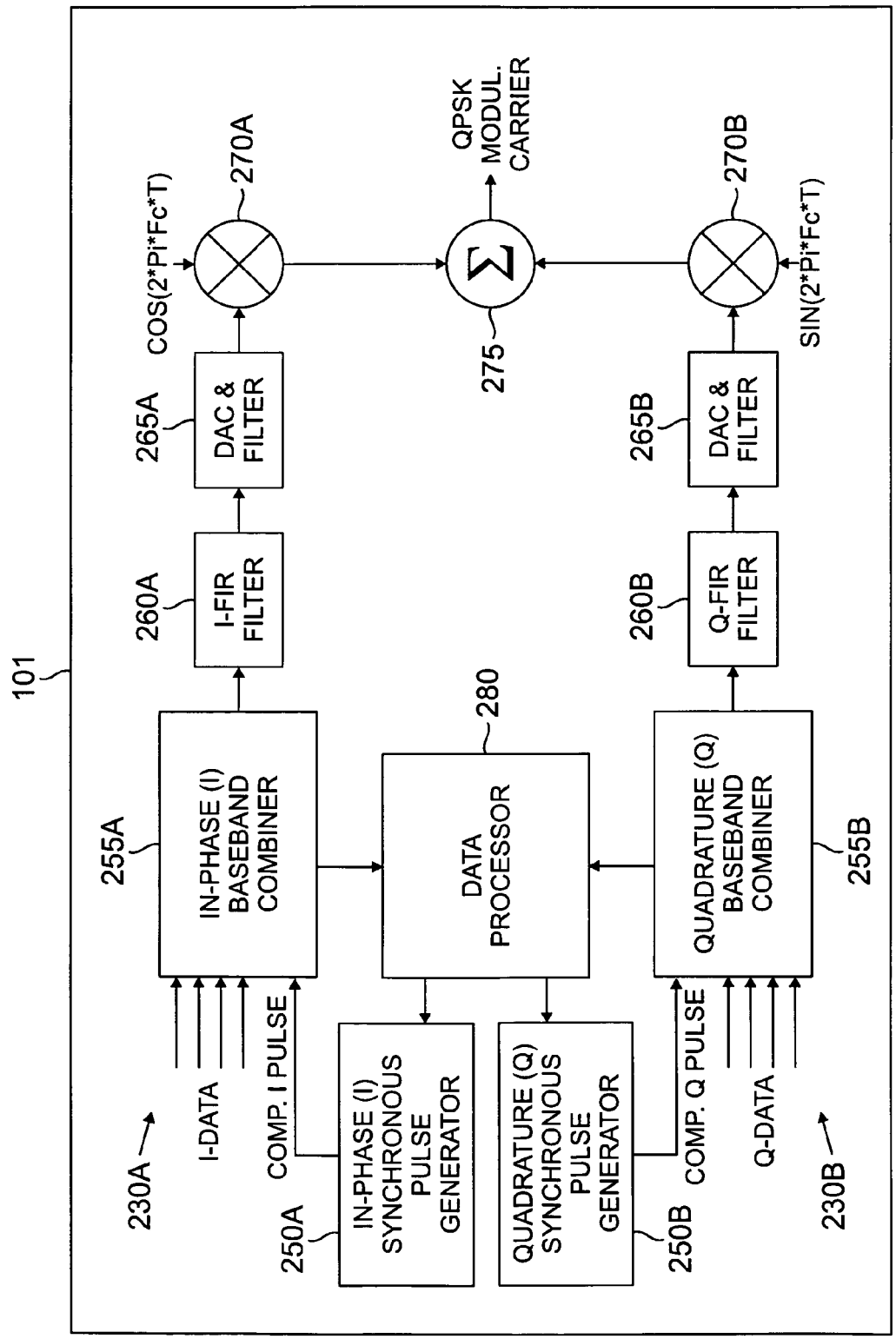
FIG. 2B illustrates selected portions of the transmitter circuitry in a base station for processing of in-phase digital streams and processing of quadrature digital streams for quadrature phase shift keying modulation (QPSK) of an RF carrier according to one embodiment of the present invention.

FIG. 2B illustrates selected portions of the transmitter circuitry in base station 101 according to one embodiment of the present invention. Base station 101 contains quadrature phase-shift keying (QPSK) circuitry that combines a plurality of in-phase (I) chip sequences (I-DATA) 230A and a plurality of quadrature (Q) chip sequences (Q-DATA) 230B. The I-DATA chip sequences 230A are processed by in-phase (I) synchronous pulse generator 250A, in-phase baseband combiner 255A, in-phase finite impulse response (I-FIR) filter 260A, digital-to-analog converter (DAC) and filter block 265A. The Q-DATA chip sequences 230B are processed by quadrature (Q) synchronous pulse generator 250B, quadrature (Q) baseband combiner 255B, quadrature finite impulse response (Q-FIR) filter 260B, digital-to-analog converter (DAC) and filter block 265B. Those skilled in the art will recognized that the transmitter circuitry in BS 101 also comprises a quadrature modulator formed by mixer 270A, mixer 270B and combiner 275. The transmitter circuitry in BS101 also comprises data processor 280, which controls the operation of I-synchronous pulse generator 250A and Q-synchronous pulse generator 250B.

The present invention synchronously adds compensation pulses (Compensation I pulse and Compensation Q pulse) to the combined, multi-user CDMA chip sequences in such a manner that it reduces the peak-to-average ratio of the QPSK modulated signal applied to a CDMA amplifier. The technique introduces minimal degradation in the signal detection by a CDMA receiver since the de-correlation process spreads the energy in the applied pulse over all chips in the spread spectrum modulation symbol. It is well known to those skilled in the art that a direct-sequence spread spectrum (DSSS) waveform is resilient to the application of a single pulse to a sequence of chips.

In multi-access CDMA communication systems, a QPSK transmitted signal is generated by quadrature modulation of a carrier with I and Q chip sequences which are generated according to the user data. Because the channels may be activated independently of each other, the composite signals for the I and Q components are a sum of digital channel signals having non-deterministic phases. Thus, even when the modulation used for each channel has a constant amplitude envelope over time, the composite signal will not exhibit a constant envelope. Rather, the composite signal may be described as having uniform random phase distribution and a Rayleigh probability density amplitude envelope. The resulting Rayleigh-distributed envelope has undesirably high peak-to-average power requirements that places demanding linearity and dynamic range requirements on the power amplifier in the transmit signal path.

Typically, the QPSK signal streams exhibit a peak-to-average power ratio that ranges from 10 dB to 14 dB. Large peaks in the transmitted signal lead to inefficient usage of the power amplifier. This, in turn, leads to large heat dissipation. Considering the theoretical efficiency limit of a Class AB amplifier, these ratios would require the transmitter amplifier to operate at an efficiency below 15% for single-carrier amplification and below 10% for multi-carrier amplification. This compares rather poorly with the 65% efficiency that can be attained with constant envelope modulation.

In FIG. 2B, the transmitter circuitry combines the multiple bipolar I and Q signals from the transmit segments of multiple channel elements in a multiaccess digital communications system. In-phase baseband combiner 255A clocks in, buffers, and sums the sequentially corresponding chips from each of the I-DATA baseband chip sequences 230A at the incoming chip rate to form a composite I chip sequence. Likewise, quadrature baseband combiner 255B clocks in, buffers, and sums the sequentially corresponding chips from each of the Q-DATA baseband chip sequences 230B at the incoming chip rate to form a composite Q chip sequence.

In-phase baseband combiner 255A also receives a Compensation I pulse from in-phase synchronous pulse generator 250A and combines it with the composite I chip sequence to produce a compensated I chip sequence in which the peak-to-average ratio is held at or below a pre-determined maximum threshold established by the system operator. The compensated I chip sequence is filtered by I-FIR filter 260A and DAC and filter block 265A and applied to one input of mixer 270 of the quadrature modulator. Similarly, quadrature baseband combiner 255B also receives a Compensation Q pulse from quadrature synchronous pulse generator 250B and combines it with the composite Q chip sequence to produce a compensated Q chip sequence in which the peak-to-average ratio is held at or below a pre-determined maximum threshold established by the system operator. The compensated Q chip sequence is filtered by Q-FIR filter 260B and DAC and filter block 265B and applied to one input of mixer 270B of the quadrature modulator.

I-FIR filter 260A and Q-FIR filter 260B are pulse shaping filters and DAC and filter block 265A and DAC and filter block 265B contain reconstruction filters which shape the I and Q pulses according to communication system specifications. The filtered I and Q signals are applied to the inputs of the quadrature modulator (i.e., mixer 270A, mixer 270B, and combiner 275) for RF modulation of a carrier signal and are amplified and transmitted over a communication channel.

To obtain reduction of the crest factor (i.e., peak-to-average ratio), each of in-phase baseband combiner 255A and quadrature baseband combiner 255B reports the uncompensated composite (or combined) chip amplitude to data processor 280. If the composite chip amplitude exceeds a specified value corresponding to the predetermined maximum threshold of the crest factor, data processor 280 determines the amplitude and polarity of a compensation pulse which, when sequentially combined with the corresponding I or Q composite chip sequences, produces a combined signal that is within allowed limits. The synchronously added compensation pulses have the same pulse width as the CDMA chip. The resulting compensated I and Q baseband chip streams are then filtered and applied to the quadrature modulator.

Consider a set of twelve CDMA direct sequence chips of unity relative amplitude (+1 or −1) as shown in Table 1 below that are applied as the I-DATA chip sequences in FIG. 2.

TABLE 1

| Channel | Chip Sequence number | | | | | | | | |
|---|---|---|---|---|---|---|---|---|---|
|  | 1 | 2 | 3 | 4 | 5 | ... | 24 | 25 | ... |
| 1 | −1 | −1 | −1 | +1 | −1 | ... | +1 | −1 | ... |
| 2 | +1 | −1 | +1 | +1 | +1 | ... | −1 | +1 | ... |
| 3 | −1 | −1 | −1 | +1 | +1 | ... | −1 | +1 | ... |
| 4 | −1 | −1 | +1 | −1 | +1 | ... | −1 | −1 | ... |
| 5 | +1 | +1 | −1 | +1 | +1 | ... | −1 | −1 | ... |
| 6 | +1 | −1 | +1 | +1 | +1 | ... | −1 | +1 | ... |
| 7 | −1 | +1 | +1 | +1 | +1 | ... | +1 | −1 | ... |
| 8 | +1 | +1 | +1 | +1 | +1 | ... | −1 | +1 | ... |
| 9 | −1 | −1 | +1 | −1 | +1 | ... | −1 | −1 | ... |
| 10 | +1 | −1 | +1 | +1 | +1 | ... | −1 | −1 | ... |

TABLE 1-continued

| Channel | Chip Sequence number | | | | | | | | |
|---|---|---|---|---|---|---|---|---|---|
|  | 1 | 2 | 3 | 4 | 5 | ... | 24 | 25 | ... |
| 11 | −1 | +1 | +1 | −1 | +1 | ... | +1 | −1 | ... |
| 12 | −1 | −1 | −1 | +1 | −1 | ... | −1 | +1 | ... |
| Comp. I: | −2 | −4 | +4 | +6 | +10 | ... | −6 | −2 | ... |

Note that while the actual chip sequence for each channel may have a different amplitude, an example with unity amplitude chip sequences does not change the basic concept or operation of the present invention. The combining process produces the composite I signal chip sequence in the last row of Table 1.

Figure 3A:
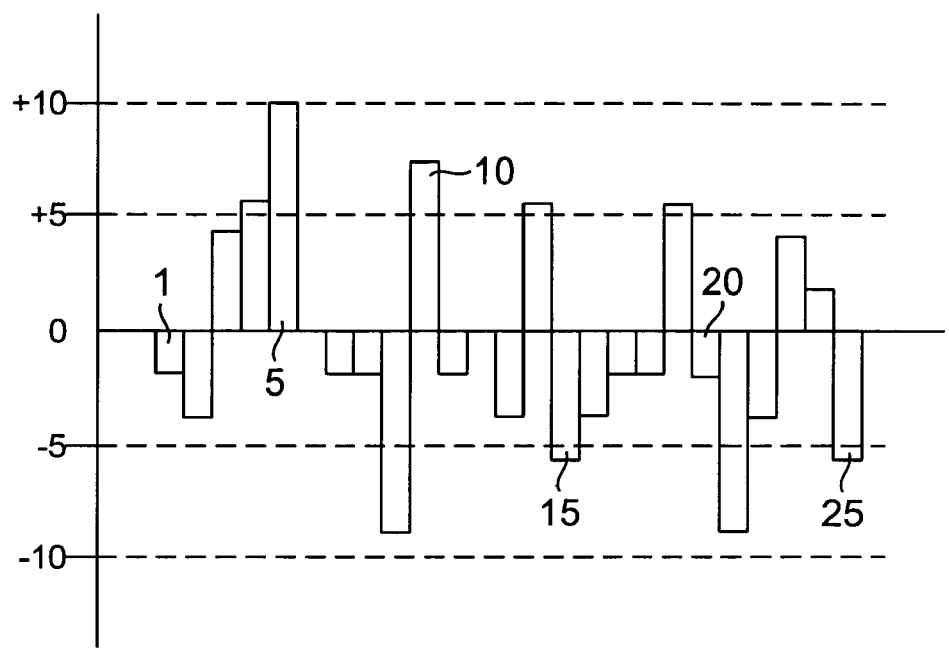
FIG. 3A illustrates a timing diagram of an exemplary series of sequential combined chips that form an exemplary composite I chip sequence in the in-phase baseband combiner.
Figure 3B:
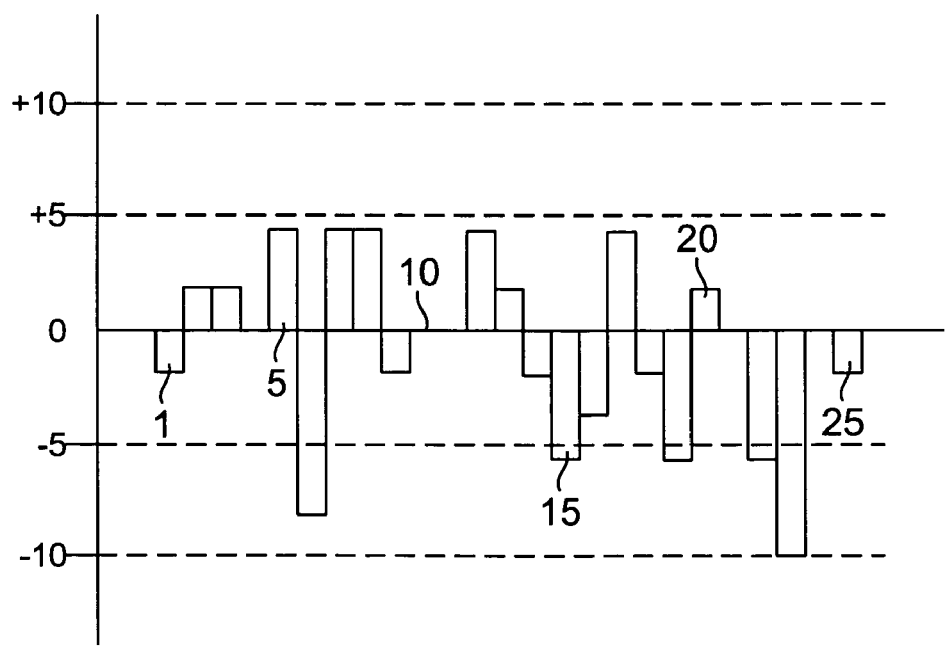
FIG. 3B illustrates a timing diagram of an exemplary series of sequential combined chips that form an exemplary composite Q chip sequence in the quadrature baseband combiner.
Figure 4:
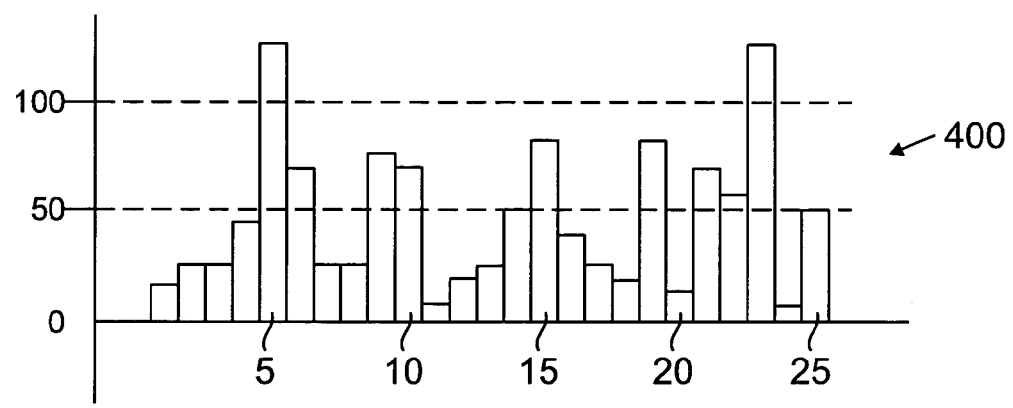
FIG. 4 illustrates a QPSK power envelope of a modulated carrier in which the chip sequences in FIGS. 3A and 3B are used to modulate the carrier signal.

FIG. 3A illustrates a timing diagram of an exemplary series of sequential combined chips that form an exemplary composite I chip sequence in in-phase baseband combiner 255A. Exemplary combined chips 1, 5, 10, 15, 20 and 25 are labeled. A signal maximum occurs at chip time slot 5. Similarly, FIG. 3B illustrates a timing diagram of an exemplary series of sequential combined chips that form an exemplary composite Q chip sequence in quadrature baseband combiner 255B. Exemplary combined chips 1, 5, 10, 15, 20 and 25 are labeled. A signal maximum occurs at chip time slot 23. FIG. 4 illustrates QPSK power envelope 400 of a modulated carrier in which the chip sequences in FIGS. 3A and 3B are used to modulate the carrier signal. The corresponding peak-to-average ratio for this signal is 12.4 dB.

Figure 5A:
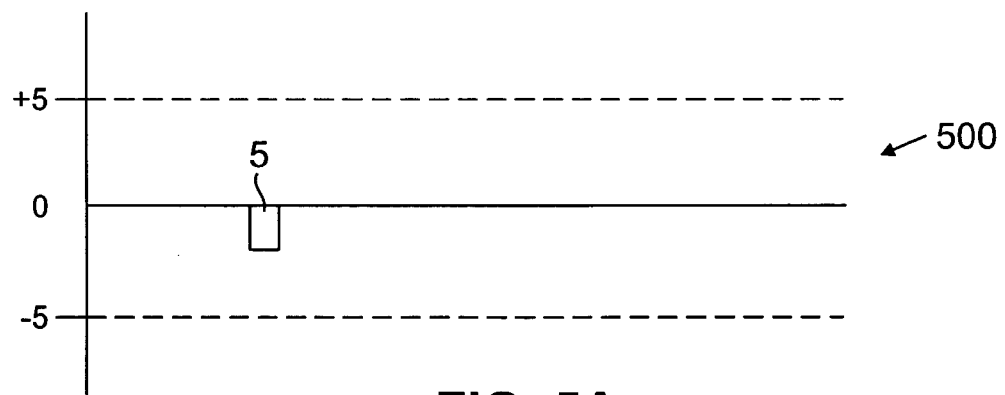
FIG. 5A is a timing diagram of a compensation pulse of amplitude −2 that is synchronously combined with the composite I chip sequence in FIG. 3A during chip time slot 5.
Figure 5B:
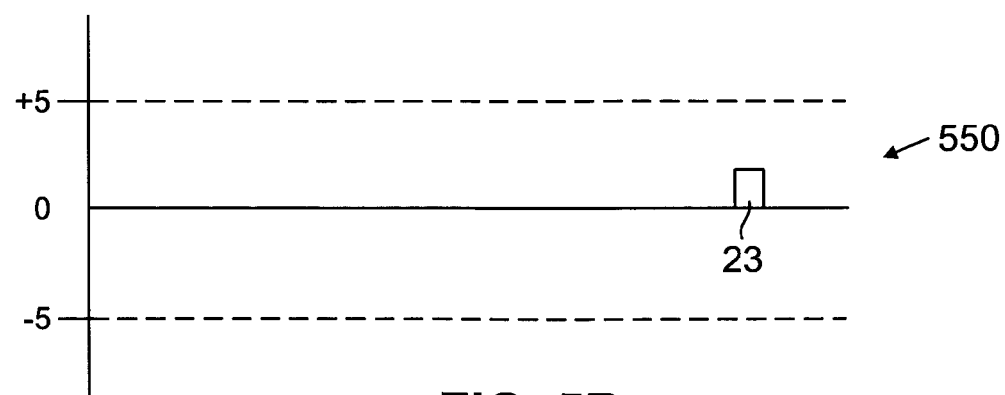
FIG. 5B is a timing diagram of a compensation pulse of amplitude +2 that synchronously combined with the composite Q chip sequence in FIG. 3B during chip time slot 23.

FIG. 5A illustrates timing diagram 500, in which a compensation pulse of amplitude −2 is synchronously combined with the composite I chip sequence in FIG. 3A during chip time slot 5. FIG. 5B illustrates timing diagram 550, in which a compensation pulse of amplitude +2 is synchronously combined with the composite Q chip sequence in FIG. 3B during chip time slot 23. The compensation pulses in FIGS. 5A and 5B keep each combined chip amplitude below a relative threshold amplitude of 8. The calculated peak-to-average is 8.4 dB. If the pulses shown in FIGS. 5A and 5B are applied to the chip sequences in FIGS. 3A and 3B, respectively, the peak-to-average ratio is reduced to 5.5 dB.

Figure 6:
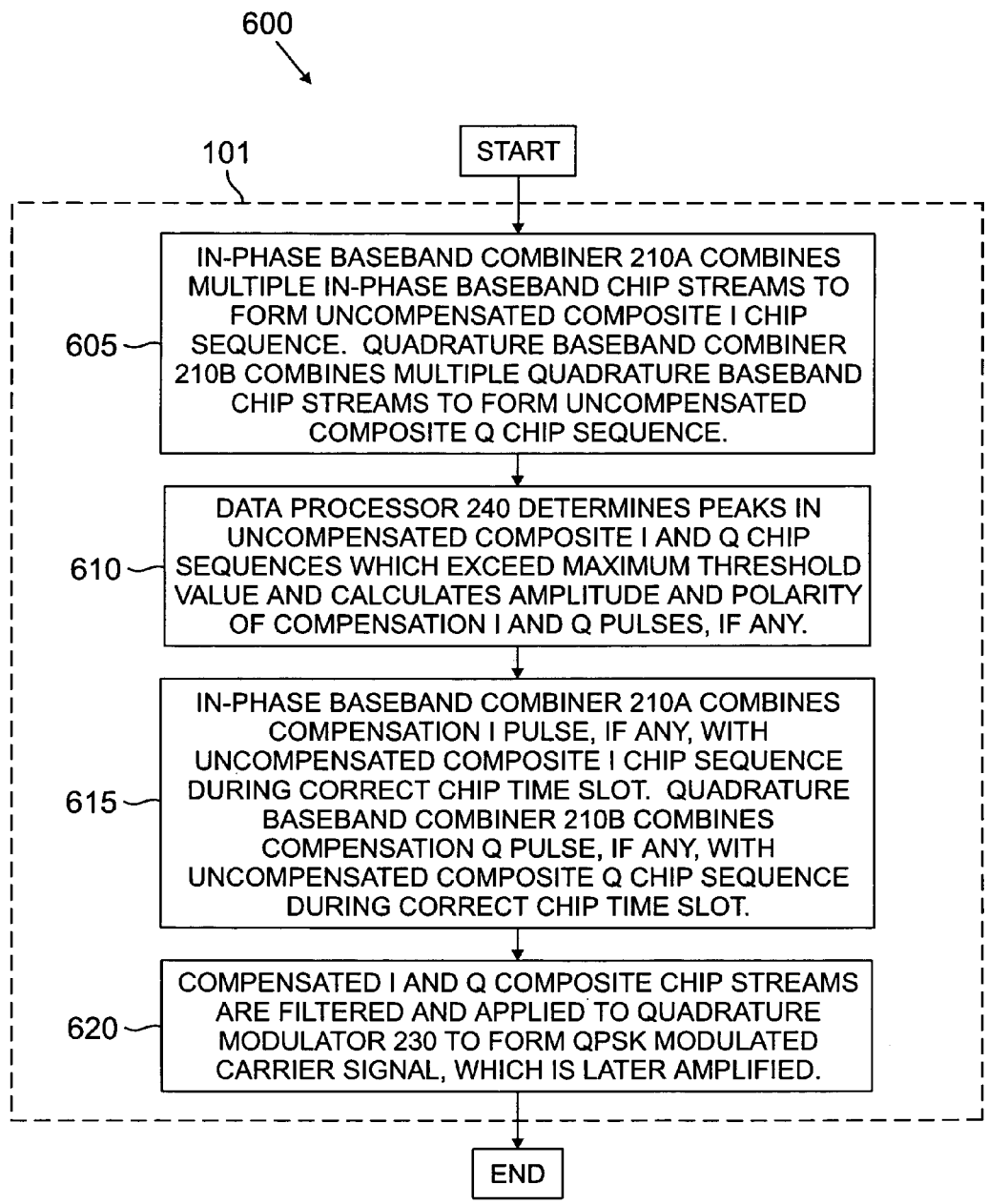
FIG. 6 is a flow diagram illustrating the operation of the peak-to-average power ratio limiting circuitry in the transmit path of an exemplary base station.

FIG. 6 depicts flow diagram 600, which illustrates the operation of the peak-to-average power ratio limiting circuitry in the transmit path of exemplary base station according to one embodiment of the present invention. Initially, in-phase baseband combiner 255A combines multiple in-phase baseband chip streams to form an uncompensated composite I chip sequence, and quadrature baseband combiner 255B combines multiple quadrature baseband chip streams to form an uncompensated composite Q chip sequence (process step 605). Data processor 280 determines the peaks in the uncompensated composite I and Q chip sequences which exceed the specified maximum threshold value. Data processor 280 then calculates the amplitude and polarity of the compensation I and Q pulses, if any (process step 610). In-phase baseband combiner 255A combines the compensation I pulse(s), if any, with the uncompensated composite I chip sequence during the correct chip time slot(s). Quadrature baseband combiner 255B also combines the compensation Q pulse(s), if any, with the uncompensated composite Q chip sequence during the correct chip time slot(s) (process step 615). The compensated I and Q composite chip streams are filtered and applied to the quadrature modulator to form a QPSK modulated carrier signal, which is later amplified (process step 620).

The present invention requires less processing power and fewer components than the prior art devices for peak-to-average power ratio reduction. The present invention also requires less processing power and fewer components than amplifier linearization techniques for ACP reduction. Furthermore, the present invention does not rely on amplitude compensation with FIR filter techniques.

An alternate embodiment of the present invention operates in a closed loop form, as opposed to an open loop configuration described above. In such an embodiment, the data processor generates a spectral representation of the amplified output of the pulse compensated signal from samples taken at the amplifier output. The spectral representation of the amplifier output provides an estimate of the adjacent channel power. The level of ACP terms is used to adjust the amplitude of the pulses generated by the synchronous pulse generators in FIG. 2B.

The present invention introduces the use of compensation pulse generators to reduce the peak-to-average power ratio (or crest factor) of direct sequence spread spectrum signals. Reduction of the peak-to-average ratio allows a CDMA power amplifier to operate with less back-off and, therefore, with greater efficiency. The present invention allows a wireless service provider to operate power amplifiers in wireless network base stations or access points with greater efficiency (i.e., less power). Hence, smaller amplifiers and power supplies are required for a given RF output power. In addition, heat dissipation requirements are reduced, as are the size of heat sinks and cooling requirements.

Although the present invention has been described in detail, those skilled in the art should understand that they can make various changes, substitutions and alterations herein without departing from the spirit and scope of the invention in its broadest form.

What is claimed is:

1. A CDMA transmitter comprising:
   a first baseband combiner capable of receiving N baseband chip streams, each of said N baseband chip streams comprising a sequence of chips, each chip having one of a positive amplitude value and a negative amplitude value, wherein said first baseband combiner combines chips from corresponding time slots in each of said N baseband chip streams to thereby generate a first composite baseband chip sequence;
   a data processor coupled to said first baseband combiner capable of detecting a first peak amplitude in said first composite baseband chip sequence that exceeds a pre-determined maximum threshold and determining an amplitude and a polarity of a first compensation pulse associated with said first peak amplitude; and
   a pulse generator coupled to said data processor capable of generating said first compensation pulse having said amplitude and said polarity determined by said data processor, wherein said first baseband combiner receives said first compensation pulse and combines said first compensation pulse with said first composite baseband chip sequence during a chip time slot corresponding to said first peak amplitude.

2. The CDMA transmitter as set forth in claim 1 wherein said data processor determines said amplitude and said polarity of said first compensation pulse as a function of a maximum peak-to-average power ratio associated with said first composite baseband chip sequence.

3. The CDMA transmitter as set forth in claim 2 wherein said each chip in each of said N baseband chip streams has one of a +1 relative amplitude value and −1 relative amplitude value.

4. The CDMA transmitter as set forth in claim 3 wherein said CDMA transmitter is a quadrature phase-shift keying (QPSK) transmitter and said first composite baseband chip sequence is a composite in-phase chip sequence.

5. The CDMA transmitter as set forth in claim 1 further comprising:
   a second baseband combiner capable of receiving M baseband chip streams, each of said M baseband chip streams comprising a sequence of chips, each chip having one of a positive amplitude value and a negative amplitude value, wherein said second baseband combiner combines chips from corresponding time slots in each of said M baseband chip streams to thereby generate a second composite baseband chip sequence, wherein said data processor is coupled to said second baseband combiner and is further capable of detecting a second peak amplitude in said second composite baseband chip sequence that exceeds a pre-determined maximum threshold and determining an amplitude and a polarity of a second compensation pulse associated with said second peak amplitude; and
   a second pulse generator coupled to said data processor capable of generating said second compensation pulse having said amplitude and said polarity determined by said data processor, wherein said second baseband combiner receives said second compensation pulse and combines said second compensation pulse with said second composite baseband chip sequence during a chip time slot corresponding to said second peak amplitude.

6. The CDMA transmitter as set forth in claim 5 wherein said data processor determines said amplitude and said polarity of said second compensation pulse as a function of a maximum peak-to-average power ratio associated with said second composite baseband chip sequence.

7. The CDMA transmitter as set forth in claim 6 wherein said each chip in each of said M baseband chip streams has one of a +1 relative amplitude value and −1 relative amplitude value.

8. The CDMA transmitter as set forth in claim 7 wherein said CDMA transmitter is a quadrature phase-shift keying (QPSK) transmitter and said second composite baseband chip sequence is a composite quadrature chip sequence.

9. A wireless communication network comprising:
   a plurality of base stations capable of communicating with a plurality of mobile stations disposed in a coverage are of said plurality of base stations; and
   a CDMA transmitter associated with at least one of said plurality of base stations, said CDMA transmitter comprising:
     a first baseband combiner capable of receiving N baseband chip streams, each of said N baseband chip streams comprising a sequence of chips, each chip having one of a positive amplitude value and a negative amplitude value, wherein said first baseband combiner combines chips from corresponding time slots in each of said N baseband chip streams to thereby generate a first composite baseband chip sequence;
     a data processor coupled to said first baseband combiner capable of detecting a first peak amplitude in said first composite baseband chip sequence that exceeds a pre-determined maximum threshold and determining an amplitude and a polarity of a first compensation pulse associated with said first peak amplitude; and a pulse generator coupled to said data processor capable of generating said first compensation pulse having said amplitude and said polarity determined by said data processor, wherein said first baseband combiner receives said first compensation pulse and combines said first compensation pulse with said first composite baseband chip sequence during a chip time slot corresponding to said first peak amplitude.

10. The wireless communication network as set forth in claim 9 wherein said data processor determines said amplitude and said polarity of said first compensation pulse as a function of a maximum peak-to-average power ratio associated with said first composite baseband chip sequence.

11. The wireless communication network as set forth in claim 10 wherein said each chip in each of said N baseband chip streams has one of a +1 relative amplitude value and −1 relative amplitude value.

12. The wireless communication network as set forth in claim 11 wherein said CDMA transmitter is a quadrature phase-shift keying (QPSK) transmitter and said first composite baseband chip sequence is a composite in-phase chip sequence.

13. The wireless communication network as set forth in claim 9, wherein the CDMA transmitter further comprises:
a second baseband combiner capable of receiving M baseband chip streams, each of said M baseband chip streams comprising a sequence of chips, each chip having one of a positive amplitude value and a negative amplitude value, wherein said second baseband combiner combines chips from corresponding time slots in each of said M baseband chip streams to thereby generate a second composite baseband chip sequence, wherein said data processor is coupled to said second baseband combiner and is further capable of detecting a second peak amplitude in said second composite baseband chip sequence that exceeds a pre-determined maximum threshold and determining an amplitude and a polarity of a second compensation pulse associated with said second peak amplitude; and
a second pulse generator coupled to said data processor capable of generating said second compensation pulse having said amplitude and said polarity determined by said data processor, wherein said second baseband combiner receives said second compensation pulse and combines said second compensation pulse with said second composite baseband chip sequence during a chip time slot corresponding to said second peak amplitude.

14. The wireless communication network as set forth in claim 13 wherein said data processor determines said amplitude and said polarity of said second compensation pulse as a function of a maximum peak-to-average power ratio associated with said second composite baseband chip sequence.

15. The wireless communication network as set forth in claim 14 wherein said each chip in each of said M baseband chip streams has one of a +1 relative amplitude value and −1 relative amplitude value.

16. The wireless communication network as set forth in claim 15 wherein said CDMA transmitter is a quadrature phase-shift keying (QPSK) transmitter and said second composite baseband chip sequence is a composite quadrature chip sequence.

17. A method of processing baseband chip streams in a CDMA transmitter, the method comprising the steps of:
receiving N baseband chip streams, each of the N baseband chip streams comprising a sequence of chips, each chip having one of a positive amplitude value and a negative amplitude value;
combining chips from corresponding time slots in each of the N baseband chip streams to thereby generate a first composite baseband chip sequence;
detecting a first peak amplitude in the first composite baseband chip sequence that exceeds a pre-determined maximum threshold;
determining an amplitude and a polarity of a first compensation pulse associated with the first peak amplitude;
generating the first compensation pulse having the determined amplitude and polarity; and
combining the first compensation pulse with the first composite baseband chip sequence during a chip time slot corresponding to the first peak amplitude.

18. The method as set forth in claim 17 wherein the amplitude and the polarity of the first compensation pulse are determined as a function of a maximum peak-to-average power ratio associated with the first composite baseband chip sequence.

19. The method as set forth in claim 18 wherein each chip in each of the N baseband chip streams has one of a +1 relative amplitude value and −1 relative amplitude value.

20. The method as set forth in claim 17 further comprising the steps of:
receiving M baseband chip streams, each of the M baseband chip streams comprising a sequence of chips, each chip having one of a positive amplitude value and a negative amplitude value;
combining chips from corresponding time slots in each of the M baseband chip streams to thereby generate a second composite baseband chip sequence;
detecting a second peak amplitude in the second composite baseband chip sequence that exceeds a pre-determined maximum threshold;
determining an amplitude and a polarity of a second compensation pulse associated with the second peak amplitude;
generating the second compensation pulse having the determined amplitude and polarity; and
combining the second compensation pulse with the second composite baseband chip sequence during a chip time slot corresponding to the second peak amplitude.

21. The method as set forth in claim 20 wherein the amplitude and the polarity of the second compensation pulse are determined as a function of a maximum peak-to-average power ratio associated with the second composite baseband chip sequence.

22. The method as set forth in claim 21 wherein each chip in each of the M baseband chip streams has one of a +1 relative amplitude value and −1 relative amplitude value.

* * * * *